(12) United States Patent
Hughes et al.

(10) Patent No.: US 12,269,962 B2
(45) Date of Patent: Apr. 8, 2025

(54) STABLE COATING COMPOSITIONS AND METHODS OF PREPARING AND USING THE SAME

(71) Applicant: ARMSTRONG WORLD INDUSTRIES, INC., Lancaster, PA (US)

(72) Inventors: John E. Hughes, Lincoln University, PA (US); Linzhu Zhang, Ephrata, PA (US); Lori Jo L. Shearer, Millersville, PA (US)

(73) Assignee: AWI Licensing LLC, Wilmington, DE (US)

( * ) Notice: Subject to any disclaimer, the term of this patent is extended or adjusted under 35 U.S.C. 154(b) by 45 days.

(21) Appl. No.: 18/115,701

(22) Filed: Feb. 28, 2023

(65) Prior Publication Data

US 2023/0279257 A1 Sep. 7, 2023

Related U.S. Application Data

(60) Provisional application No. 63/315,365, filed on Mar. 1, 2022.

(51) Int. Cl.
  *C09D 157/00* (2006.01)
  *C09D 1/00* (2006.01)
  (Continued)

(52) U.S. Cl.
  CPC ............. *C09D 157/00* (2013.01); *C09D 1/00* (2013.01); *C09D 7/20* (2018.01); *C09D 7/61* (2018.01); *C09D 7/63* (2018.01)

(58) Field of Classification Search
  CPC .......... C09D 157/00; C09D 1/00; C09D 7/20; C09D 7/61; C09D 7/63; C09D 7/45;
  (Continued)

(56) References Cited

U.S. PATENT DOCUMENTS 3,383,317 A 5/1968 Jacoby
3,389,118 A 6/1968 Gordon
(Continued)

OTHER PUBLICATIONS

Surface and Therman Properties of Synthesized Cationic Poly(ethylene oxide) Gemini Surfactants: The Role of the Spacer, Hussain et al., Royal Society of Chemistry, 2019, 9, 30154 (2019).
(Continued)

*Primary Examiner* — Jennifer A Smith
*Assistant Examiner* — Jeffrey Eugene Barzach
(74) *Attorney, Agent, or Firm* — Patrick Sheldrake

(57) ABSTRACT

Described herein is a coating composition suitable for application to a panel. The coating composition exhibits stability upon exposure to various temperatures, such as temperatures which induce freezing and thawing. The coating composition comprises calcium carbonate; titanium dioxide; opacity pigment composite comprising $TiO_2$ encapsulated within a precipitated calcium carbonate shell; calcined diatomaceous earth; calcium chloride, aluminum hydroxide; and vinyl acrylic polymer. Described herein are also building panels coated with the coating composition and methods of their formation.

17 Claims, 5 Drawing Sheets

(51) Int. Cl.
 *C09D 7/20* (2018.01)
 *C09D 7/61* (2018.01)
 *C09D 7/63* (2018.01)

(58) Field of Classification Search
 CPC .......... C09D 133/04; C09D 7/62; C09D 7/70; C08K 2003/2241; C08K 2003/265; C08K 9/10
 See application file for complete search history.

(56) References Cited

U.S. PATENT DOCUMENTS

| | | |
|---|---|---|
| 6,143,064 A | 11/2000 | Virtanen |
| 2006/0137843 A1 | 6/2006 | Sutman |
| 2011/0011305 A1* | 1/2011 | Maijala .................. D21H 19/38 524/413 |
| 2018/0258638 A1 | 9/2018 | Hughes |
| 2020/0290927 A1 | 9/2020 | Wang |
| 2020/0347242 A1* | 11/2020 | Goldman ............... C09D 5/185 |
| 2021/0047524 A1 | 2/2021 | Hughes |
| 2021/0062031 A1 | 3/2021 | Boone |
| 2021/0147294 A1 | 5/2021 | Gozum |
| 2021/0198514 A1 | 7/2021 | Fine |
| 2022/0033638 A1* | 2/2022 | Hsu .................. C08F 220/1808 |

OTHER PUBLICATIONS

Substitution of TiO2 With PCC (Precipitated Calcium Carbonate) in Waterborne Paints, Hassas et al., Research Gate, Conference Paper, (2013).

* cited by examiner

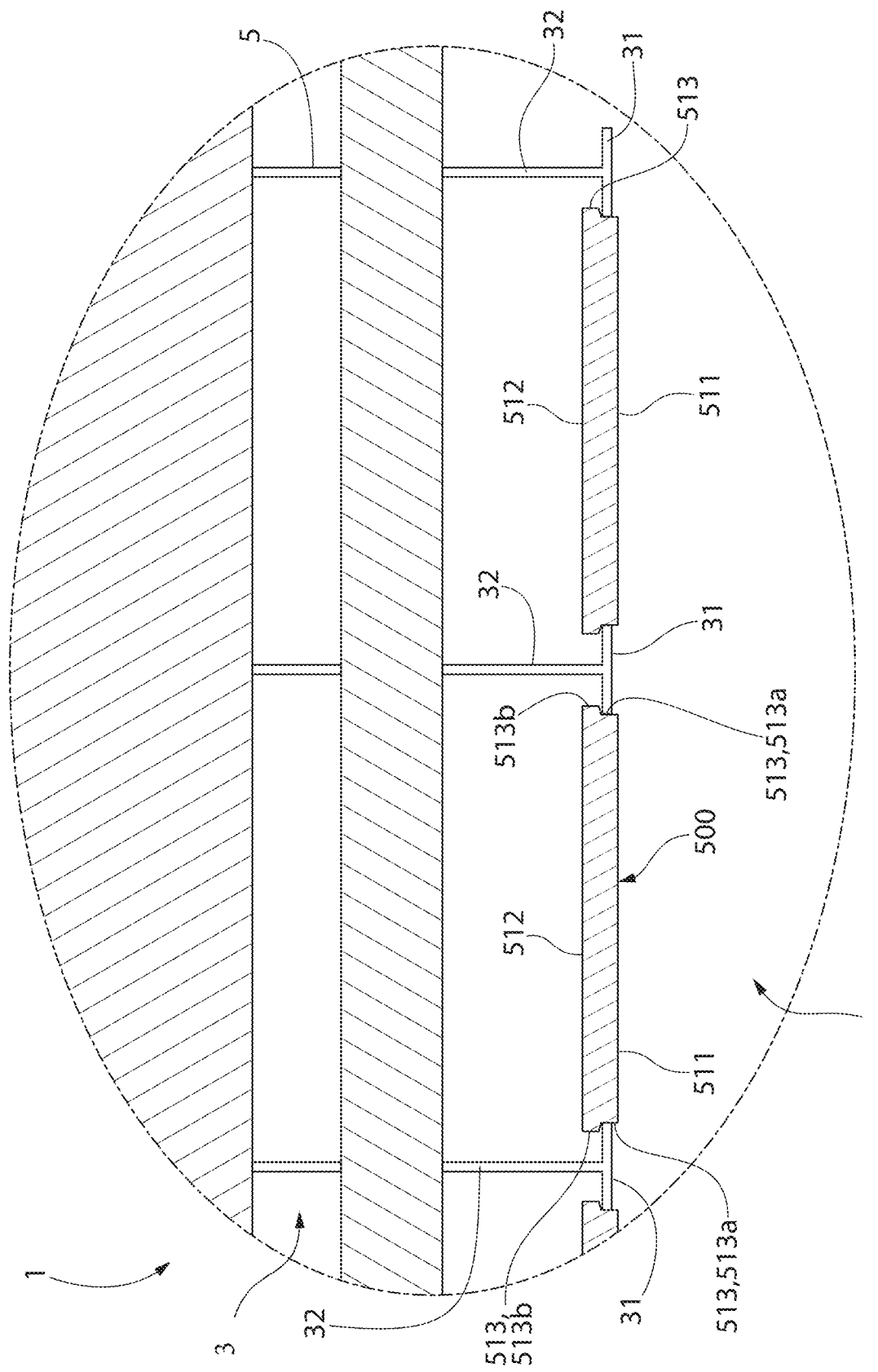

STABLE COATING COMPOSITIONS AND METHODS OF PREPARING AND USING THE SAME

CROSS-REFERENCE TO RELATED APPLICATIONS

This application claims the benefit of U.S. Provisional Patent Application No. 63/315,365 filed on Mar. 1, 2022. The disclosure of the above application is incorporated herein by reference in its entirety for all purposes.

FIELD OF THE DISCLOSURE

The present disclosure relates to coating compositions for coating panels, such as ceiling and wall panels, and more particularly to coating compositions which are stable under extreme temperature conditions.

BACKGROUND

Building materials, such as planks and panels of ceiling and wall systems, may undergo extreme conditions during transportation and storage. For example, typical temperatures during transportation and storage may vary from high temperatures of up to about 120° F. and cold temperatures down to below 30° F. Therefore, having a building material coating which is stable under such conditions is significant.

Building material coatings typically form agglomerations when exposed to such extreme temperatures. The clumped mass then settles to the bottom of the composition and cannot be mixed back into the coating. This results in painters having to filter out the clumped mass which reduces effectiveness of the coating aesthetic and performance. Typically, extra coating layers are then needed to cover the building material, which increases both costs and time.

Thus, there is a need for improved coating compositions having stability at extreme temperatures without compromising aesthetic or performance traits.

SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Applicants have discovered coating compositions useful for application on panels, such as wall or ceiling panels. Such coatings provide for compositional stability when exposed to extreme temperatures.

Thus, in certain embodiments, the present invention provides a coating composition comprising calcium carbonate; titanium dioxide; opacity pigment composite comprising $TiO_2$ encapsulated within a precipitated calcium carbonate shell; calcined diatomaceous earth; calcium chloride; aluminum hydroxide; and vinyl acrylic polymer. In certain embodiments, the calcium carbonate is present in an amount from about 20 wt. % to about 40 wt. %, from about 25 wt. % to about 35 wt. %, or from about 27.0 wt. % to about 32.5 wt. %, based on the dry weight of the composition. In certain embodiments, the titanium dioxide not part of the opacity pigment composite is present in an amount from about 10 wt. % to about 40 wt. %, from about 15 wt. % to about 35 wt. %, or from about 20 wt. % to about 30 wt. %, based on the dry weight of the composition. In certain embodiments, the opacity pigment composite is present in an amount from about 8 wt. % to about 30 wt. %, from about 10 wt. % to about 25 wt. %, or from about 15 wt. % to about 20 wt. %, based on the dry weight of the composition. In certain embodiments, the calcined diatomaceous earth is present in an amount from about 3 wt. % to about 20 wt. %, from about 5 wt. % to about 17.5 wt. %, or from about 7.5 wt. % to about 15 wt. %, based on the dry weight of the composition. In certain embodiments, the calcium chloride is present in an amount from about 2.5 wt. % to about 20 wt. %, from about 5 wt. % to about 15 wt. %, or from about 5 wt. % to about 10 wt. %, based on the dry weight of the composition. In certain embodiments, the aluminum hydroxide is present in an amount from about 3 wt. % to about 20 wt. %, from about 5 wt. % to about 15 wt. %, or from about 5 wt. % to about 10 wt. %, based on the dry weight of the composition. In certain embodiments, the vinyl acrylic polymer is present in an amount from about 2 wt. % to about 20 wt. %, from about 2 wt. % to about 15 wt. %, or from about 3 wt. % to about 10 wt. %, based on the dry weight of the composition. In certain embodiments, the composition further comprises a hydrophobic polymer emulsion. In certain embodiments, the hydrophobic polymer emulsion is present in an amount from about 0.1 wt. % to about 10 wt. %, from about 0.5 wt. % to about 5.0 wt. %, or from about 0.75 wt. % to about 3 wt. %, based on the dry weight of the composition. In certain embodiments, the composition further comprises a wetting and dispersing additive comprising an anionic copolymer. In certain embodiments, the wetting and dispersing additive has an acid value of about 2 mg KOH/g. In certain embodiments, the wetting and dispersing additive is present in an amount from about 0.1 wt. % to about 5 wt. %, from about 0.1 wt. % to about 2 wt. %, or from about 0.1 wt. % to about 0.5 wt. %, based on the dry weight of the composition. In certain embodiments, the composition further comprises an ethoxylated acetylenic gemini surfactant, optionally wherein the surfactant is non-ionic. In certain embodiments, the ethoxylated acetylenic gemini surfactant is present in an amount from about 0.01 wt. % to about 2 wt. %, from about 0.01 wt. % to about 1 wt. %, or from about 0.01 wt. % to about 0.5 wt. %, based on the dry weight of the composition. In certain embodiments, the composition contains no clay, or is free of clay. In certain embodiments, the composition further comprises clay, and wherein the clay is present in an amount from about 0.01 wt. % to about 5 wt. %, from about 0.03 wt. % to about 2 wt. %, or from about 0.03 wt. % to about 0.5 wt. %, based on the dry weight of the composition. In certain embodiments, the clay is a hectorite clay. In certain embodiments, the composition further comprises a defoamer. In certain embodiments, the defoamer comprises wax and mineral oil. In certain embodiments, the defoamer is present in an amount from about 0.01 wt. % to about 2 wt. %, from about 0.01 wt. % to about 1 wt. %, or from about 0.01 wt. % to about 0.1 wt. %, based on the dry weight of the composition. In certain embodiments, the composition further comprises one or more biocides. In certain embodiments, the one or more biocides are present in an amount from about 0.01 wt. % to about 1 wt. %, from about 0.05 wt. % to about 0.5 wt. %, or from about 0.05 wt. % to about 0.4 wt. %, based on the dry weight of the composition. In certain embodiments, the weight ratio of calcium carbonate to vinyl acrylic polymer is from about 2:1 to about 15:1, from about 2:1 to about 12:1, from about 2:1 to about 10:1, or from about 3:1 to about 8:1, based on the dry weight of the composition. In certain embodiments, the weight ratio of calcined diatomaceous earth to vinyl acrylic polymer is from about 0.5:1 to about 10:1, from about 0.75:1 to about 10:1, from about 1:1 to about 7:1, or from about 0.5:1 to about 4:1, based on the dry weight of the composition. In certain embodiments, the weight ratio of calcium carbonate and calcined diatomaceous earth to vinyl acrylic polymer is from about 3:1 to about 15:1, from about 4:1 to about 12:1, from about 5:1 to about 10:1, or from about 5:1 to about 8.5:1, based on the dry weight of the composition. In certain embodiments, the weight ratio of titanium dioxide, opacity pigment, and calcium carbonate to calcium chloride is from about 30:1 to about 5:1, from about 28:1 to about 5.5:1, from about 20:1 to about 6:1, or from about 10:1 to about 6:1, based on the dry weight of the composition.

In certain embodiments, the present invention is a panel comprising a first major surface opposite a second major surface and a side surface extending there-between, the panel coated on at least one surface with a coating composition comprising calcium carbonate; titanium dioxide; opacity pigment composite comprising $TiO_2$ encapsulated within a precipitated calcium carbonate shell; calcined diatomaceous earth; calcium chloride; aluminum hydroxide; and vinyl acrylic polymer. In certain embodiments, the calcium carbonate is present in an amount from about 20 wt. % to about 40 wt. %, from about 25 wt. % to about 35 wt. %, or from about 27.0 wt. % to about 32.5 wt. %, based on the dry weight of the composition. In certain embodiments, the titanium dioxide not part of the opacity pigment composite is present in an amount from about 10 wt. % to about 40 wt. %, from about 15 wt. % to about 35 wt. %, or from about 20 wt. % to about 30 wt. %, based on the dry weight of the composition. In certain embodiments, the opacity pigment composite is present in an amount from about 8 wt. % to about 30 wt. %, from about 10 wt. % to about 25 wt. %, or from about 15 wt. % to about 20 wt. %, based on the dry weight of the composition. In certain embodiments, the calcined diatomaceous earth is present in an amount from about 3 wt. % to about 20 wt. %, from about 5 wt. % to about 17.5 wt. %, or from about 7.5 wt. % to about 15 wt. %, based on the dry weight of the composition. In certain embodiments, the calcium chloride is present in an amount from about 2.5 wt. % to about 20 wt. %, from about 5 wt. % to about 15 wt. %, or from about 5 wt. % to about 10 wt. %, based on the dry weight of the composition. In certain embodiments, the aluminum hydroxide is present in an amount from about 3 wt. % to about 20 wt. %, from about 5 wt. % to about 15 wt. %, or from about 5 wt. % to about 10 wt. %, based on the dry weight of the composition. In certain embodiments, the vinyl acrylic polymer is present in an amount from about 2 wt. % to about 20 wt. %, from about 2 wt. % to about 15 wt. %, or from about 3 wt. % to about 10 wt. %, based on the dry weight of the composition. In certain embodiments, the composition further comprises a hydrophobic polymer emulsion. In certain embodiments, the hydrophobic polymer emulsion is present in an amount from about 0.1 wt. % to about 10 wt. %, from about 0.5 wt. % to about 5.0 wt. %, or from about 0.75 wt. % to about 3 wt. %, based on the dry weight of the composition. In certain embodiments, the composition further comprises a wetting and dispersing additive comprising an anionic copolymer. In certain embodiments, the wetting and dispersing additive has an acid value of about 2 mg KOH/g. In certain embodiments, the wetting and dispersing additive is present in an amount from about 0.1 wt. % to about 5 wt. %, from about 0.1 wt. % to about 2 wt. %, or from about 0.1 wt. % to about 0.5 wt. %, based on the dry weight of the composition. In certain embodiments, the composition further comprises an ethoxylated acetylenic gemini surfactant, optionally wherein the surfactant is non-ionic. In certain embodiments, the ethoxylated acetylenic gemini surfactant is present in an amount from about 0.01 wt. % to about 2 wt. %, from about 0.01 wt. % to about 1 wt. %, or from about 0.01 wt. % to about 0.5 wt. %, based on the dry weight of the composition. In certain embodiments, the composition contains no clay, or is free of clay. In certain embodiments, the composition further comprises clay, and wherein the clay is present in an amount from about 0.01 wt. % to about 5 wt. %, from about 0.03 wt. % to about 2 wt. %, or from about 0.03 wt. % to about 0.5 wt. %, based on the dry weight of the composition. In certain embodiments, the clay is a hectorite clay. In certain embodiments, the composition further comprises a defoamer. In certain embodiments, the defoamer comprises wax and mineral oil. In certain embodiments, the defoamer is present in an amount from about 0.01 wt. % to about 2 wt. %, from about 0.01 wt. % to about 1 wt. %, or from about 0.01 wt. % to about 0.1 wt. %, based on the dry weight of the composition. In certain embodiments, the composition further comprises one or more biocides. In certain embodiments, the one or more biocides are present in an amount from about 0.01 wt. % to about 1 wt. %, from about 0.05 wt. % to about 0.5 wt. %, or from about 0.05 wt. % to about 0.4 wt. %, based on the dry weight of the composition. In certain embodiments, the weight ratio of calcium carbonate to vinyl acrylic polymer is from about 2:1 to about 15:1, from about 2:1 to about 12:1, from about 2:1 to about 10:1, or from about 3:1 to about 8:1, based on the dry weight of the composition. In certain embodiments, the weight ratio of calcined diatomaceous earth to vinyl acrylic polymer is from about 0.5:1 to about 10:1, from about 0.75:1 to about 10:1, from about 1:1 to about 7:1, or from about 0.5:1 to about 4:1, based on the dry weight of the composition. In certain embodiments, the weight ratio of calcium carbonate and calcined diatomaceous earth to vinyl acrylic polymer is from about 3:1 to about 15:1, from about 4:1 to about 12:1, from about 5:1 to about 10:1, or from about 5:1 to about 8.5:1, based on the dry weight of the composition. In certain embodiments, the weight ratio of titanium dioxide, opacity pigment, and calcium carbonate to calcium chloride is from about 30:1 to about 5:1, from about 28:1 to about 5.5:1, from about 20:1 to about 6:1, or from about 10:1 to about 6:1, based on the dry weight of the composition. In certain embodiments, the panel is a ceiling or wall panel.

In other embodiments, the invention is a method for forming a building panel comprising a heat stable coating composition, comprising mixing calcium carbonate, titanium dioxide, opacity pigment composite comprising $TiO_2$ encapsulated within a precipitated calcium carbonate shell, calcined diatomaceous earth, calcium chloride, aluminum hydroxide, vinyl acrylic polymer, and a solvent to form a mixed composition; applying the mixed composition to a surface of a panel; and heating the panel at an elevated temperature to evaporate the solvent to yield a dry coating composition. In certain embodiments, the solvent is water. In certain embodiments, the elevated temperature is between 25° C. to about 85° C. In certain embodiments, the calcium carbonate is present in an amount from about 20 wt. % to about 40 wt. %, from about 25 wt. % to about 35 wt. %, or from about 27.0 wt. % to about 32.5 wt. %, based on the dry weight of the composition. In certain embodiments, the titanium dioxide not part of the opacity pigment composite is present in an amount from about 10 wt. % to about 40 wt. %, from about 15 wt. % to about 35 wt. %, or from about 20 wt. % to about 30 wt. %, based on the dry weight of the composition. In certain embodiments, the opacity pigment composite is present in an amount from about 8 wt. % to about 30 wt. %, from about 10 wt. % to about 25 wt. %, or from about 15 wt. % to about 20 wt. %, based on the dry weight of the composition. In certain embodiments, the calcined diatomaceous earth is present in an amount from about 3 wt. % to about 20 wt. %, from about 5 wt. % to about 17.5 wt. %, or from about 7.5 wt. % to about 15 wt. %, based on the dry weight of the composition. In certain embodiments, the calcium chloride is present in an amount from about 2.5 wt. % to about 20 wt. %, from about 5 wt. % to about 15 wt. %, or from about 5 wt. % to about 10 wt. %, based on the dry weight of the composition. In certain embodiments, the aluminum hydroxide is present in an amount from about 3 wt. % to about 20 wt. %, from about 5 wt. % to about 15 wt. %, or from about 5 wt. % to about 10 wt. %, based on the dry weight of the composition. In certain embodiments, the vinyl acrylic polymer is present in an amount from about 2 wt. % to about 20 wt. %, from about 2 wt. % to about 15 wt. %, or from about 3 wt. % to about 10 wt. %, based on the dry weight of the composition. In certain embodiments, the composition further comprises a hydrophobic polymer emulsion. In certain embodiments, the hydrophobic polymer emulsion is present in an amount from about 0.1 wt. % to about 10 wt. %, from about 0.5 wt. % to about 5.0 wt. %, or from about 0.75 wt. % to about 3 wt. %, based on the dry weight of the composition. In certain embodiments, the composition further comprises a wetting and dispersing additive comprising an anionic copolymer. In certain embodiments, the wetting and dispersing additive has an acid value of about 2 mg KOH/g. In certain embodiments, the wetting and dispersing additive is present in an amount from about 0.1 wt. % to about 5 wt. %, from about 0.1 wt. % to about 2 wt. %, or from about 0.1 wt. % to about 0.5 wt. %, based on the dry weight of the composition. In certain embodiments, the composition further comprises an ethoxylated acetylenic gemini surfactant, optionally wherein the surfactant is non-ionic. In certain embodiments, the ethoxylated acetylenic gemini surfactant is present in an amount from about 0.01 wt. % to about 2 wt. %, from about 0.01 wt. % to about 1 wt. %, or from about 0.01 wt. % to about 0.5 wt. %, based on the dry weight of the composition. In certain embodiments, the composition contains no clay, or is free of clay. In certain embodiments, the composition further comprises clay, and wherein the clay is present in an amount from about 0.01 wt. % to about 5 wt. %, from about 0.03 wt. % to about 2 wt. %, or from about 0.03 wt. % to about 0.5 wt. %, based on the dry weight of the composition. In certain embodiments, the clay is a hectorite clay. In certain embodiments, the composition further comprises a defoamer. In certain embodiments, the defoamer comprises wax and mineral oil. In certain embodiments, the defoamer is present in an amount from about 0.01 wt. % to about 2 wt. %, from about 0.01 wt. % to about 1 wt. %, or from about 0.01 wt. % to about 0.1 wt. %, based on the dry weight of the composition. In certain embodiments, the composition further comprises one or more biocides. In certain embodiments, the one or more biocides are present in an amount from about 0.01 wt. % to about 1 wt. %, from about 0.05 wt. % to about 0.5 wt. %, or from about 0.05 wt. % to about 0.4 wt. %, based on the dry weight of the composition. In certain embodiments, the weight ratio of calcium carbonate to vinyl acrylic polymer is from about 2:1 to about 15:1, from about 2:1 to about 12:1, from about 2:1 to about 10:1, or from about 3:1 to about 8:1, based on the dry weight of the composition. In certain embodiments, the weight ratio of calcined diatomaceous earth to vinyl acrylic polymer is from about 0.5:1 to about 10:1, from about 0.75:1 to about 10:1, from about 1:1 to about 7:1, or from about 0.5:1 to about 4:1, based on the dry weight of the composition. In certain embodiments, the weight ratio of calcium carbonate and calcined diatomaceous earth to vinyl acrylic polymer is from about 3:1 to about 15:1, from about 4:1 to about 12:1, from about 5:1 to about 10:1, or from about 5:1 to about 8.5:1, based on the dry weight of the composition. In certain embodiments, the weight ratio of titanium dioxide, opacity pigment, and calcium carbonate to calcium chloride is from about 30:1 to about 5:1, from about 28:1 to about 5.5:1, from about 20:1 to about 6:1, or from about 10:1 to about 6:1, based on the dry weight of the composition. In certain embodiments, the panel is a ceiling or wall panel.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DESCRIPTION OF THE DRAWINGS

The detailed description of the invention will be better understood when read in conjunction with the appended drawings. It should be understood, however, that the invention is not limited to the precise arrangements and instrumentalities of the embodiments shown in the drawings.

FIG. 5 is a close-up view of a ceiling system comprising the coated building panel according to an embodiment of the present invention, the close-up view being the portion identified by oval V in FIG. 3.

DETAILED DESCRIPTION

Figure 1:
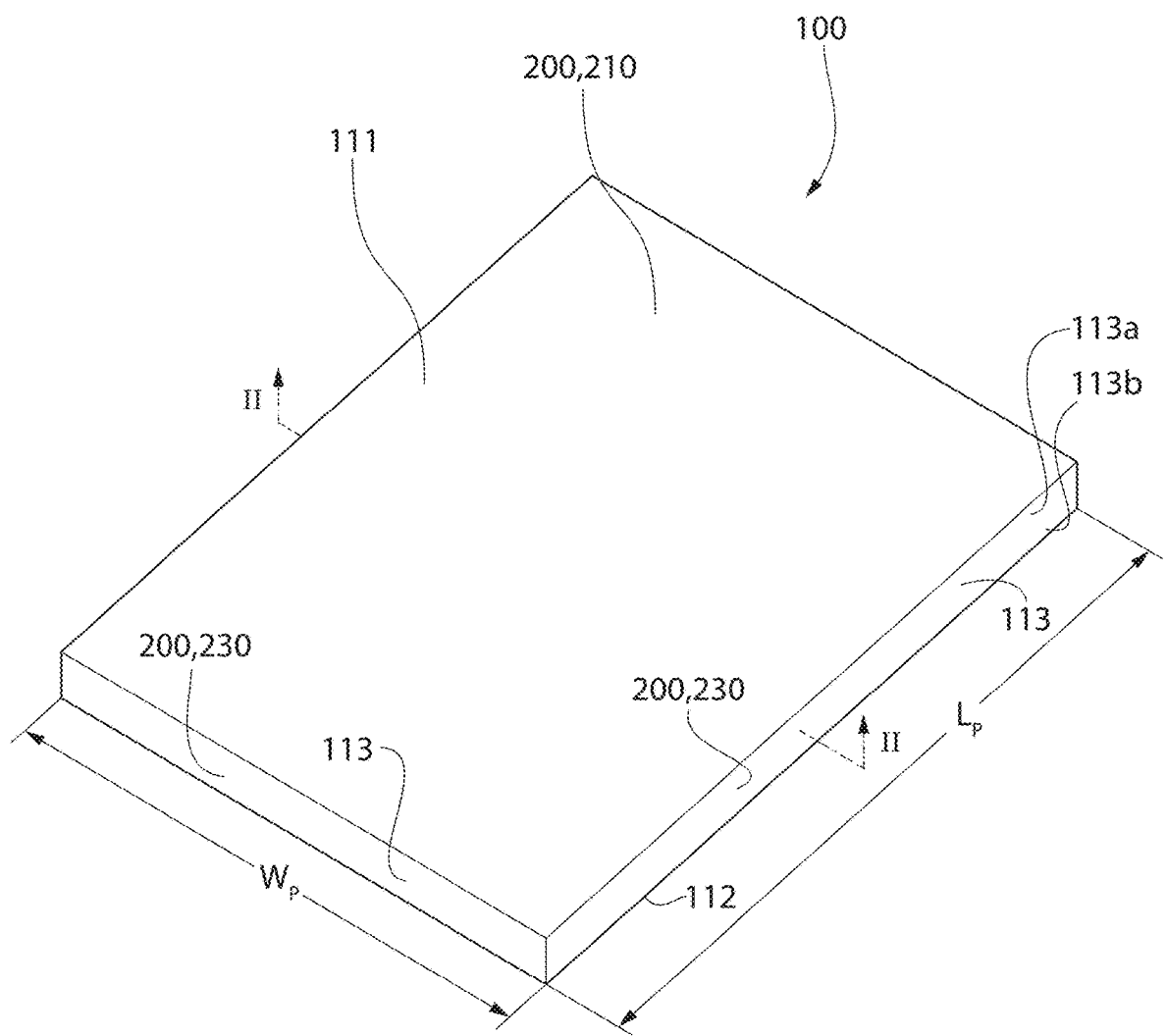
FIG. 1 is top perspective view of a coated building panel according to an embodiment of the present invention.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight of the total composition. Unless otherwise specified, reference to a molecule, or to molecules, being present at a "wt. %" refers to the amount of that molecule, or molecules, present in the composition based on the total weight of the composition. Unless otherwise specified, reference to a molecule, or to molecules, being present "based on the dry weight of the composition" refers to that molecule, or molecules, being present in the composition based on the total weight of the composition in a dry state. The "dry state" refers to solvent being present in the composition at an amount less than 5.0 wt. %, less than about 3.0 wt. %, less than about 1.0 wt. %; preferably less than about 0.5 wt. %, and more preferably less than about 0.25 wt. % of the composition. For example, a composition in the dry state may refer to a composition having about 95% solids, about 98% solids, preferably about 99% solids, or more preferably about 100% solids. By contrast, unless otherwise specified, reference to a molecule, or to molecules, being present "based on the wet weight of the composition" refers to that molecule, or molecules, being present in the composition based on the total weight of the composition which includes at least 5 wt. % of solvent.

According to the present application, use of the term "about" in conjunction with a numeral value refers to a value that may be +/−5% of that numeral. As used herein, the term "substantially free" is intended to mean an amount less than about 5.0 wt. %, less than 3.0 wt. %, less than 1.0 wt. %; preferably less than about 0.5 wt. %, and more preferably less than about 0.25 wt. % of the composition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing (if applicable) under discussion. These relative terms are for convenience of description only and, unless specified otherwise, do not require that the apparatus be constructed or operated in a particular orientation.

As used herein, terms such as "attached," "affixed," "connected," "coupled," "interconnected," and the like refer to a relationship wherein structures are secured or attached to one another either directly or indirectly through intervening structures, as well as both movable or rigid attachments or relationships, unless expressly described otherwise. Accordingly, the disclosure is not limited to such exemplary embodiments illustrating certain combinations of features that may exist alone or in combination with other features.

The present disclosure is directed towards a coating composition, methods of making the composition, and panels coated with the coating composition. The present invention makes use of calcium chloride as a component of a coating composition comprising calcium carbonate and titanium dioxide. The inventors have surprisingly and unexpectedly discovered that use of calcium chloride within the coating yields a stable coating composition upon exposure to extreme temperatures, such as, for example, temperatures which induce freezing and/or freezing and thawing. As such, the coating composition is useful to provide a coating composition having stability when exposed to extreme high and/or low temperatures. In certain aspects, the coating composition is useful for coating panels, such as, for example, for use on a building panel. In certain aspects, the building panel is a ceiling panel or wall panel.

The amount or concentration of the calcium carbonate may vary. The calcium carbonate may be present in an amount from about 15 wt. % to about 50 wt. %—including all amounts in between, based on the wet or dry weight of the composition. For example, calcium carbonate may be present in an amount of about 15 wt. %, about 17.5 wt. %, about 20 wt. %, about 22.5 wt. %, about 25 wt. %, about 27.5 wt. %, about 30 wt. %, about 32.5 wt. %, about 35 wt. %, about 37.5 wt. %, about 40 wt. %, about 42.5 wt. %, about 45 wt. %, or about 50 wt. %, based on the wet or dry weight of the composition. In another example, calcium carbonate is present in an amount from about 15 to about 45 wt. %, from about 17 to about 43 wt. %, from about 22 to about 35 wt. %, from about 22.5 to about 37.5 wt. %, from about 25 to about 35 wt. %, or from about 27.5 to about 32.5 wt. %, based on the wet or dry weight of the composition. In further embodiments, calcium carbonate is present in an amount from about 20 wt. % to about 40 wt. %, from about 25 wt. % to about 35 wt. %, or from about 27.0 wt. % to about 32.5 wt. %, based on the wet or dry weight of the composition.

The present invention makes use of titanium dioxide ($TiO_2$) as a component of the composition. Various sources of $TiO_2$ may be used. In certain embodiments, the $TiO_2$ is from a rutile source. In certain embodiments, the $TiO_2$ may have a mean particle size of about 0.50 μm. In certain embodiments, the $TiO_2$ may a specific gravity of about 3.9. In certain embodiments, the $TiO_2$ may an oil absorption of about 18.7. In certain embodiments, the $TiO_2$ may have a pH from about 7.0 to about 8.0. In certain embodiments, the $TiO_2$ may have a pH of about 7.2. Useful titanium dioxides are available under the TI-PURE® (DuPont Company, Wilmington, Del.), TIONA® (Millennium Chemicals, Maryland), TRONOX® (Tronox Incorporated, Oklahoma City, Okla.), and TIOXIDE® (Huntsman Pigments, England) trademarks.

The amount or concentration of the titanium dioxide may vary. The titanium dioxide may be present in an amount from about 10 to about 50 wt. %—including all amounts in between, based on the wet or dry weight of the composition. For example, titanium dioxide may be present in an amount of about 10 wt. %, about 12.5 wt. %, about 15 wt. %, about 17.5 wt. %, about 20 wt. %, about 22.5 wt. %, about 25 wt. %, about 27.5 wt. %, about 30 wt. %, about 32.5 wt. %, about 35 wt. %, about 37.5 wt. %, about 40 wt. %, about 42.5 wt. %, about 45 wt. %, about 47.5 wt. %, or about 50 wt. %, based on the wet or dry weight of the composition. In another example, titanium dioxide is present in an amount from about 10 to about 45 wt. %, from about 12.5 to about 40 wt. %, from about 15 to about 35 wt. %, from about 17.5 to about 32.5 wt. %, from about 17.5 to about 30 wt. %, from about 20 to about 30 wt. %, or from about 22.5 to about 29.5 wt. %, based on the wet or dry weight of the composition. In further embodiments, titanium dioxide is present in an amount from about 10 wt. % to about 40 wt. %, from about 15 wt. % to about 35 wt. %, or from about 20 wt. % to about 30 wt. %, based on the wet or dry weight of the composition.

In some embodiments, the coating comprises titanium dioxide in a free form (e.g., the titanium dioxide is provided as a stand-alone compound). In other embodiments, the coating comprises titanium dioxide both in a free form and within a composite, such as an opacity pigment (to be discussed further below). As such, in some embodiments, the above cited amounts may refer to total titanium dioxide present in the coating composition. In other embodiments, the above cited amounts may refer to only the free form of titanium dioxide. For example, if it is recited that the titanium dioxide amount is not part of the opacity pigment composite, and the composition comprises both free form titanium dioxide and an opacity pigment composite which comprises titanium dioxide encapsulated within a precipitated calcium carbonate shell, then the cited titanium dioxide amounts may refer to only the free form titanium dioxide.

The present invention makes use of an opacity pigment composite as a component of the composition. In certain embodiments, the opacity pigment composite comprises titanium dioxide encapsulated within a precipitated calcium carbonate shell. Such calcium carbonate titanium dioxide composites are known in the art and are also commercially available. (See, for example, Sun et al., Materials, 2018, 11(7), 1131; Karakas et al., Progress in Organic Coatings, 2015, 83, 64-70; U.S. Pat. No. 6,143,064; SoCal® UP-G from Imerys, Paris, France; or FP-Opacity Pigments™ from FP Pigments, Espoo, Finland). In certain embodiments, the opacity pigment composite has a specific surface area of about 10.0 m$^2$/g. In certain embodiments, the opacity pigment composite has an average particle size of about 1.0 µm. In certain embodiments, the opacity pigment composite has an oil absorption of about 43 g/100 g.

The amount or concentration of the opacity pigment composite may vary. The opacity pigment composite may be present in an amount from about 5 to about 35 wt. %—including all amounts in between, based on the wet or dry weight of the composition. For example, the opacity pigment composite may be present in an amount of about 5 wt. %, about 7.5 wt. %, about 10 wt. %, about 12.5 wt. %, about 15 wt. %, about 17.5 wt. %, about 20 wt. %, about 22.5 wt. %, about 25 wt. %, about 27.5 wt. %, or about 30 wt. %, based on the wet or dry weight of the composition. In another example, the opacity pigment composite is present in an amount from about 5 to about 30 wt. %, from about 10 to about 25 wt. %, from about 15 to about 25 wt. %, from about 15 to about 22.5 wt. %, or from about 15 to about 20 wt. %, based on the wet or dry weight of the composition. In further embodiments, the opacity pigment composite is present in an amount from about 8 wt. % to about 30 wt. %, from about 10 wt. % to about 25 wt. %, or from about 15 wt. % to about 20 wt. %, based on the wet or dry weight of the composition.

The present invention makes use of calcined diatomaceous earth as a component of the coating. Without being bound to theory, it is believed that calcined diatomaceous earth is treated at temperatures above 1000° C., which induces the exoskeletons of the diatoms to harden. Specifically, it is believed that this process causes the amorphous silica that makes up the exoskeleton of the diatom to turn into crystalline silica. Calcined diatomaceous earth may have a pH from about 10.0 to about 11.5. The chemical composition of calcined diatomaceous earth may vary. Typically, calcined diatomaceous earth comprises $SiO_2$ at about 94.9 wt. %, CaO at about 2.7 wt. %, $Al_2O_3$ at about 0.6 wt. %, $Na_2O$ at about 0.9 wt. %, $Fe_2O_3$ at about 0.4 wt. %, and $K_2O$ at about 0.1 wt. %.

The amount or concentration of the calcined diatomaceous earth may vary. The calcined diatomaceous earth may be present in an amount from about 3 to about 25 wt. %—including all amounts in between, based on the wet or dry weight of the composition. For example, calcined diatomaceous earth may be present in an amount of about 3 wt. %, about 5 wt. %, about 7.5 wt. %, about 8 wt. %, about 9 wt. %, about 10 wt. %, about 10.5 wt. %, about 11 wt. %, about 13 wt. %, about 15 wt. %, about 17 wt. %, about 18.5 wt. %, about 20 wt. %, about 22.5 wt. %, or about 25 wt. %, based on the wet or dry weight of the composition. In another example, calcined diatomaceous earth may be present in an amount from about 3 to about 20 wt. %, from about 5 to about 18 wt. %, from about 5 to about 15 wt. %, from about 7 to about 15 wt. %, or from about 8 to about 14 wt. %, based on the wet or dry weight of the composition. In further embodiments, calcined diatomaceous earth is present in an amount from about 3 wt. % to about 20 wt. %, from about 5 wt. % to about 17.5 wt. %, or from about 7.5 wt. % to about 15 wt. %, based on the wet or dry weight of the composition.

The present invention makes use of calcium chloride as a component of the coating. The amount or concentration of the calcium chloride may vary. The calcium chloride may be present in an amount from about 2.5 to about 20 wt. %—including all amounts in between, based on the wet or dry weight of the composition. For example, calcium chloride may be present in an amount of about 2.5 wt. %, about 3 wt. %, about 5 wt. %, about 7 wt. %, about 7.5 wt. %, about 8 wt. %, about 9 wt. %, about 10 wt. %, about 10.5 wt. %, about 11 wt. %, about 13 wt. %, about 15 wt. %, about 17 wt. %, about 18.5 wt. %, or about 20 wt. %, based on the wet or dry weight of the composition. In another example, calcium chloride may be present in an amount from about 3 to about 20 wt. %, from about 4 to about 18 wt. %, from about 4 to about 15 wt. %, from about 5 to about 15 wt. %, or from about 5 to about 14 wt. %, based on the wet or dry weight of the composition. In further embodiments, calcium chloride is present in an amount from about 2.5 wt. % to about 20 wt. %, from about 5 wt. % to about 15 wt. %, or from about 5 wt. % to about 10 wt. %, based on the wet or dry weight of the composition.

The present invention may make use of aluminum hydroxide as a component of the composition. The amount or concentration of the aluminum hydroxide may vary. The aluminum hydroxide may be present in an amount from about 3 to about 25 wt. %—including all amounts in between, based on the wet or dry weight of the composition. For example, aluminum hydroxide may be present in an amount of about 3 wt. %, about 5 wt. %, about 7 wt. %, about 7.5 wt. %, about 8 wt. %, about 9 wt. %, about 10 wt. %, about 10.5 wt. %, about 11 wt. %, about 13 wt. %, about 15 wt. %, about 17 wt. %, about 18.5 wt. %, about 20 wt. %, about 22.5 wt. %, or about 25 wt. %, based on the wet or dry weight of the composition. In another example, aluminum hydroxide may be present in an amount from about 3 to about 20 wt. %, from about 4 to about 18 wt. %, from about 4 to about 15 wt. %, from about 5 to about 15 wt. %, or from about 5 to about 14 wt. %, based on the wet or dry weight of the composition. In further embodiments, aluminum hydroxide is present in an amount from about 3 wt. % to about 20 wt. %, from about 5 wt. % to about 15 wt. %, or from about 5 wt. % to about 10 wt. %, based on the wet or dry weight of the composition.

The present invention makes use of vinyl acrylic polymer as a component of the composition. Without being bound to theory, it is believed that the vinyl acrylic polymer is useful as a binder. In certain embodiments, the vinyl acrylic polymer is anionic. In certain embodiments, the vinyl acrylic polymer has a Tg of about 37° C. In certain embodiments, the vinyl acrylic polymer has a viscosity of about 30 cP, as measured by Brookfield LVT #2 at 60 rpm. In certain embodiments, the vinyl acrylic polymer has a pH of about 7.0. In certain embodiments, the vinyl acrylic polymer has a solids content of about 50%. In certain embodiments, the vinyl acrylic polymer has a specific gravity of about 1.08.

The amount or concentration of the vinyl acrylic polymer may vary. The vinyl acrylic polymer may be present in an amount from about 2 to about 20 wt. %—including all amounts in between, based on the wet or dry weight of the composition. For example, vinyl acrylic polymer may be present in an amount of about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 10 wt. %, about 12 wt. %, about 15 wt. %, or about 20 wt. %, based on the wet or dry weight of the composition. In another example, vinyl acrylic polymer may be present in an amount from about 2 to about 15 wt. %, from about 2 to about 18 wt. %, from about 2 to about 15 wt. %, from about 2 to about 10 wt. %, or from about 3 to about 8.5 wt. %, based on the wet or dry weight of the composition. In further embodiments, vinyl acrylic polymer is present in an amount from about 2 wt. % to about 20 wt. %, from about 2 wt. % to about 15 wt. %, or from about 3 wt. % to about 10 wt. %, based on the wet or dry weight of the composition.

The present invention may make use of a hydrophobic polymer emulsion as a component of the composition. Without being bound to theory, it is believed that the hydrophobic polymer emulsion is useful as a humectant. In certain embodiments, the hydrophobic polymer emulsion has a pH from about 7.0 to about 9.0. In certain embodiments, the hydrophobic polymer emulsion has a density of about 1.03 g/cm$^3$. Hydrophobic polymer emulsions are commercially available as, for example, Nuosperse® 2000 or Nuosperse® 3200, from Elementis.

The amount or concentration of the hydrophobic polymer emulsion may vary. The hydrophobic polymer emulsion may be present in an amount from about 0.1 to about 10 wt. %—including all amounts in between, based on the wet or dry weight of the composition. For example, hydrophobic polymer emulsion may be present in an amount of about 0.1 wt. %, about 0.5 wt. %, about 1 wt. %, about 1.5 wt. %, about 2 wt. %, about 2.5 wt. %, about 3 wt. %, about 3.5 wt. %, about 4 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, or about 10 wt. %, based on the wet or dry weight of the composition. In another example, hydrophobic polymer emulsion may be present in an amount from about 0.1 to about 9 wt. %, from about 0.2 to about 8 wt. %, from about 0.5 to about 6 wt. %, from about 0.5 to about 5 wt. %, or from about 0.5 to about 2.5 wt. %, based on the wet or dry weight of the composition. In further embodiments, hydrophobic polymer emulsion is present in an amount from about 0.1 wt. % to about 10 wt. %, from about 0.5 wt. % to about 5.0 wt. %, or from about 0.75 wt. % to about 3.0 wt. %, based on the wet or dry weight of the composition.

The present invention may make use of a wetting and dispersing additive comprising an anionic copolymer as a component of the composition. In certain embodiments, the wetting and dispersing additive comprising an anionic copolymer has an acid value of about 2 mg KOH/g. In certain embodiments, the wetting and dispersing additive comprising an anionic copolymer appears as a clear to slightly hazy liquid. Wetting and dispersing additive comprising an anionic copolymer is commercially available as, for example, TEGO® Dispers 747 W, TEGO® Dispers 752 W, ZETASPERSE® 3800, or TEGO® Dispers 750 W, from Evonik.

The amount or concentration of the wetting and dispersing additive comprising an anionic copolymer may vary. The wetting and dispersing additive comprising an anionic copolymer may be present in an amount from about 0.1 to about 5 wt. %—including all amounts in between, based on the wet or dry weight of the composition. For example, wetting and dispersing additive comprising an anionic copolymer may be present in an amount of about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 1.5 wt. %, about 2 wt. %, about 2.5 wt. %, about 3 wt. %, about 3.5 wt. %, about 4 wt. %, or about 5 wt. %, based on the wet or dry weight of the composition. In another example, the wetting and dispersing additive comprising an anionic copolymer may be present in an amount from about 0.1 to about 4 wt. %, from about 0.1 to about 2 wt. %, from about 0.1 to about 1 wt. %, from about 0.1 to about 0.5 wt. %, or from about 0.1 to about 0.4 wt. %, based on the wet or dry weight of the composition. In further embodiments, the wetting and dispersing additive comprising an anionic copolymer is present in an amount from about 0.1 wt. % to about 5 wt. %, from about 0.1 wt. % to about 2 wt. %, or from about 0.1 wt. % to about 0.5 wt. %, based on the wet or dry weight of the composition.

The present invention may make use of an ethoxylated acetylenic gemini surfactant as a component of the composition. Gemini surfactants constitute a class of compounds that contain two lipophilic tail and two hydrophilic head groups chemically bonded through a spacer. In certain embodiments, the ethoxylated acetylenic gemini surfactant is nonionic. In certain embodiments, the ethoxylated acetylenic gemini surfactant is a diol. In certain embodiments, the ethoxylated acetylenic gemini surfactant appears as a clear colored liquid. Ethoxylated acetylenic gemini surfactant is commercially available as, for example Dynol™ from Evonik.

The amount or concentration of the ethoxylated acetylenic gemini surfactant may vary. The ethoxylated acetylenic gemini surfactant may be present in an amount from about 0.01 to about 5 wt. %—including all amounts in between, based on the dry weight of the composition. For example, ethoxylated acetylenic gemini surfactant may be present in an amount of about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 1 wt. %, about 1.5 wt. %, about 2 wt. %, about 2.5 wt. %, about 3 wt. %, about 3.5 wt. %, about 4 wt. %, or about 5 wt. %, based on the wet or dry weight of the composition. In another example, the ethoxylated acetylenic gemini surfactant may be present in an amount from about 0.01 to about 3.5 wt. %, from about 0.01 to about 2 wt. %, from about 0.05 to about 1 wt. %, from about 0.01 to about 0.5 wt.

%, or from about 0.03 to about 0.5 wt. %, based on the wet or dry weight of the composition. In further embodiments, the ethoxylated acetylenic gemini surfactant is present in an amount from about 0.01 wt. % to about 2 wt. %, from about 0.01 wt. % to about 1 wt. %, or from about 0.01 wt. % to about 0.5 wt. %, based on the wet or dry weight of the composition.

In certain embodiments, the present inventive composition is free of, or contains no, clay. In other embodiments, the present invention may make use of a clay as a component of the composition. In certain embodiments, the clay is hectorite clay. The amount or concentration of the clay may vary. The clay may be present in an amount from about 0.01 to about 5 wt. %—including all amounts in between, based on the wet or dry weight of the composition. For example, clay may be present in an amount of about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 1 wt. %, about 1.5 wt. %, about 2 wt. %, about 2.5 wt. %, about 3 wt. %, about 3.5 wt. %, about 4 wt. %, or about 5 wt. %, based on the wet or dry weight of the composition. In another example, the clay may be present in an amount from about 0.01 to about 4 wt. %, from about 0.03 to about 2 wt. %, from about 0.01 to about 1 wt. %, from about 0.01 to about 0.5 wt. %, or from about 0.01 to about 0.4 wt. %, based on the wet or dry weight of the composition. In further embodiments, the clay is present in an amount from about 0.01 wt. % to about 5 wt. %, from about 0.03 wt. % to about 2 wt. %, or from about 0.03 wt. % to about 0.5 wt. %, based on the wet or dry weight of the composition.

The present invention may make use of a defoamer as a component of the composition. In certain embodiments, the defoamer is wax. In certain embodiments, the defoamer is wax and mineral oil. In certain embodiments, the defoamer is a mixture of esters in wax and mineral oil. In certain embodiments, the defoamer is a mixture of esters in wax and mineral oil and has a density of 850 to 900 kg/m³ at 20° C. In certain embodiments, the defoamer is free of silicone. Exemplary commercially available defoamer may be selected from Dapro® DF 7005, Dapro® DF 880, Dapro® DF 6800, or Dapro® DF 2162 from Elementis. The amount or concentration of the defoamer may vary. The defoamer may be present in an amount from about 0.01 to about 5 wt. %—including all amounts in between, based on the wet or dry weight of the composition. For example, defoamer may be present in an amount of about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 1 wt. %, about 1.5 wt. %, about 2 wt. %, about 2.5 wt. %, about 3 wt. %, about 3.5 wt. %, about 4 wt. %, or about 5 wt. %, based on the wet or dry weight of the composition. In another example, the defoamer may be present in an amount from about 0.01 to about 4 wt. %, from about 0.03 to about 2 wt. %, from about 0.01 to about 1 wt. %, from about 0.01 to about 0.5 wt. %, or from about 0.01 to about 0.4 wt. %, based on the wet or dry weight of the composition. In further embodiments, the defoamer is present in an amount from about 0.01 wt. % to about 2 wt. %, from about 0.01 wt. % to about 1 wt. %, or from about 0.01 wt. % to about 0.1 wt. %, based on the wet or dry weight of the composition.

The present invention may make use of one or more biocides as a component of the composition. The amount or concentration of the one or more biocides may vary. The one or more biocides may be present in an amount from about 0.01 to about 3 wt. %—including all amounts in between, based on the wet or dry weight of the composition. For example, one or more biocides may be present in an amount of about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.15 wt. %, about 0.2 wt. %, about 0.25 wt. %, about 0.3 wt. %, about 0.35 wt. %, about 0.4 wt. %, or about 0.5 wt. %, based on the wet or dry weight of the composition. In another example, the one or more biocides may be present in an amount from about 0.01 to about 2 wt. %, from about 0.01 to about 1 wt. %, from about 0.03 to about 0.8 wt. %, from about 0.03 to about 0.5 wt. %, or from about 0.03 to about 0.4 wt. %, based on the wet or dry weight of the composition. In further embodiments, the one or more biocides is present in an amount from about one or more biocides are present in an amount from about 0.01 wt. % to about 1 wt. %, from about 0.05 wt. % to about 0.5 wt. %, or from about 0.05 wt. % to about 0.4 wt. %, based on the wet or dry weight of the composition.

The weight ratio of calcium carbonate to vinyl acrylic polymer may vary. In certain embodiments, the weight ratio of calcium carbonate to vinyl acrylic polymer is from about 2:1 to about 15:1, based on the wet or dry weight of the composition. In certain embodiments, the weight ratio of calcium carbonate to vinyl acrylic polymer is from about 2:1 to about 12:1, based on the wet or dry weight of the composition. In certain embodiments, the weight ratio of calcium carbonate to vinyl acrylic polymer is from about 2:1 to about 10:1, based on the wet or dry weight of the composition. In certain embodiments, the weight ratio of calcium carbonate to vinyl acrylic polymer is from about 3:1 to about 10:1, based on the wet or dry weight of the composition.

The weight ratio of calcined diatomaceous earth to vinyl acrylic polymer may vary. In certain embodiments, the weight ratio of calcined diatomaceous earth to vinyl acrylic polymer is from about 0.5:1 to about 10:1, based on the wet or dry weight of the composition. In certain embodiments, the weight ratio of calcined diatomaceous earth to vinyl acrylic polymer is from about 1:1 to about 10:1, based on the wet or dry weight of the composition. In certain embodiments, the weight ratio of calcined diatomaceous earth to vinyl acrylic polymer is from about 1:1 to about 7:1, based on the wet or dry weight of the composition. In certain embodiments, the weight ratio of calcined diatomaceous earth to vinyl acrylic polymer is from about 0.5:1 to about 5:1, based on the wet or dry weight of the composition.

The weight ratio of calcium carbonate and calcined diatomaceous earth to vinyl acrylic polymer may vary. In certain embodiments, the weight ratio of calcium carbonate and calcined diatomaceous earth to vinyl acrylic polymer is from about 3:1 to about 15:1, based on the wet or dry weight of the composition. In certain embodiments, the weight ratio of calcium carbonate and calcined diatomaceous earth to vinyl acrylic polymer is from about 3:1 to about 12:1, based on the wet or dry weight of the composition. In certain embodiments, the weight ratio of calcium carbonate and calcined diatomaceous earth to vinyl acrylic polymer is from about 4:1 to about 12:1, based on the wet or dry weight of the composition. In certain embodiments, the weight ratio of calcium carbonate and calcined diatomaceous earth to vinyl acrylic polymer is from about 5:1 to about 10:1, based on the wet or dry weight of the composition.

The weight ratio of ethoxylated acetylenic surfactant to wax and mineral oil defoamer may vary. In certain embodiments, the weight ratio of ethoxylated acetylenic gemini surfactant to wax and mineral oil defoamer is from about 1:1 to about 8:1, based on the wet or dry weight of the composition. In certain embodiments, the weight ratio of ethoxylated acetylenic gemini surfactant to wax and mineral oil defoamer is from about 2:1 to about 6:1, based on the wet or dry weight of the composition. In certain embodiments, the weight ratio of ethoxylated acetylenic gemini surfactant to wax and mineral oil defoamer is from about 3:1 to about 5:1, based on the wet or dry weight of the composition. In certain embodiments, the weight ratio of ethoxylated acetylenic gemini surfactant to wax and mineral oil defoamer is from about 3.5:1 to about 4.5:1, based on the wet or dry weight of the composition.

The weight ratio of titanium dioxide, opacity pigment, and calcium carbonate to calcium chloride may vary. In certain embodiments, the weight ratio of titanium dioxide, opacity pigment, and calcium carbonate to calcium chloride is from about 30:1 to about 4:1, from about 28:1 to about 4.5:1, from about 15:1 to about 5:1, or from about 10:1 to about 5:1, based on the wet or dry weight of the composition. In certain embodiments, the weight ratio of titanium dioxide, opacity pigment, and calcium carbonate to calcium chloride is from about 30:1 to about 5:1, from about 28:1 to about 5.5:1, from about 20:1 to about 6:1, or from about 10:1 to about 6:1, based on the wet or dry weight of the composition.

Although the present invention contains $TiO_2$, one or more further pigments may be used. Pigments known in the art may be used. In certain embodiments, the pigments are soluble in water. In certain embodiments, the pigment is an anthocyanin. The amount or concentration of the one or more pigments may vary. The one or more pigments may be present in an amount from about 1 to about 10 wt. %—including all amounts in between, based on the wet or dry weight of the composition. For example, total pigment may be present in an amount of about 1 wt. %, about 1.2 wt. %, about 1.5 wt. %, about 1.8 wt. %, about 2.0 wt. %, about 2.2 wt. %, about 2.5 wt. %, about 2.8 wt. %, about 3 wt. %, about 3.2 wt. %, about 3.4 wt. %, about 3.8 wt. %, about 4 wt. %, about 4.2 wt. %, about 4.6 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, or about 10.0 wt. %, based on the wet or dry weight of the composition. In another example, pigment may be present in an amount from about 1 to about 2.5 wt. %, from about 1.2 to about 3.8 wt. %, from about 1.2 to about 3.3 wt. %, from about 1.5 to about 4.5 wt. %, from about 3.5 to about 7.5 wt. %, from about 1.5 to about 9.5 wt. %, or from about 1.5 to about 4 wt. %, based on the wet or dry weight of the composition. In further embodiments, pigment is present in an amount from about 1 to about 2.5 wt. %, from about 1.5 to about 4.5 wt. %, from about 2.5 to about 5 wt. %, from about 2.0 to about 8.0 wt. %, or from about 2.5 to about 4.5 wt. %, based on the wet or dry weight of the composition.

In certain embodiments, the building panel may comprise one or more fire retardants. In certain embodiments, the fire retardant is selected from magnesium oxide, sodium silicate, magnesium sulfate, calcium carbonate, ammonium polyphosphate, or a combination thereof. The one or more fire retardants may be present at various amounts or concentrations. In certain embodiments, the one or more fire retardants are present in an amount from about 50 wt. % to about 70 wt. %. In certain embodiments, magnesium oxide may be present in an amount from about 10 to about 25 wt. %. In certain embodiments, sodium silicate may be present in an amount from about 10 to about 25 wt. %. In certain embodiments, magnesium sulfate may be present in an amount from about 5 to about 10 wt. %. In certain embodiments, calcium carbonate may be present in an amount from about 5 to about 10 wt. %.

Figure 4:
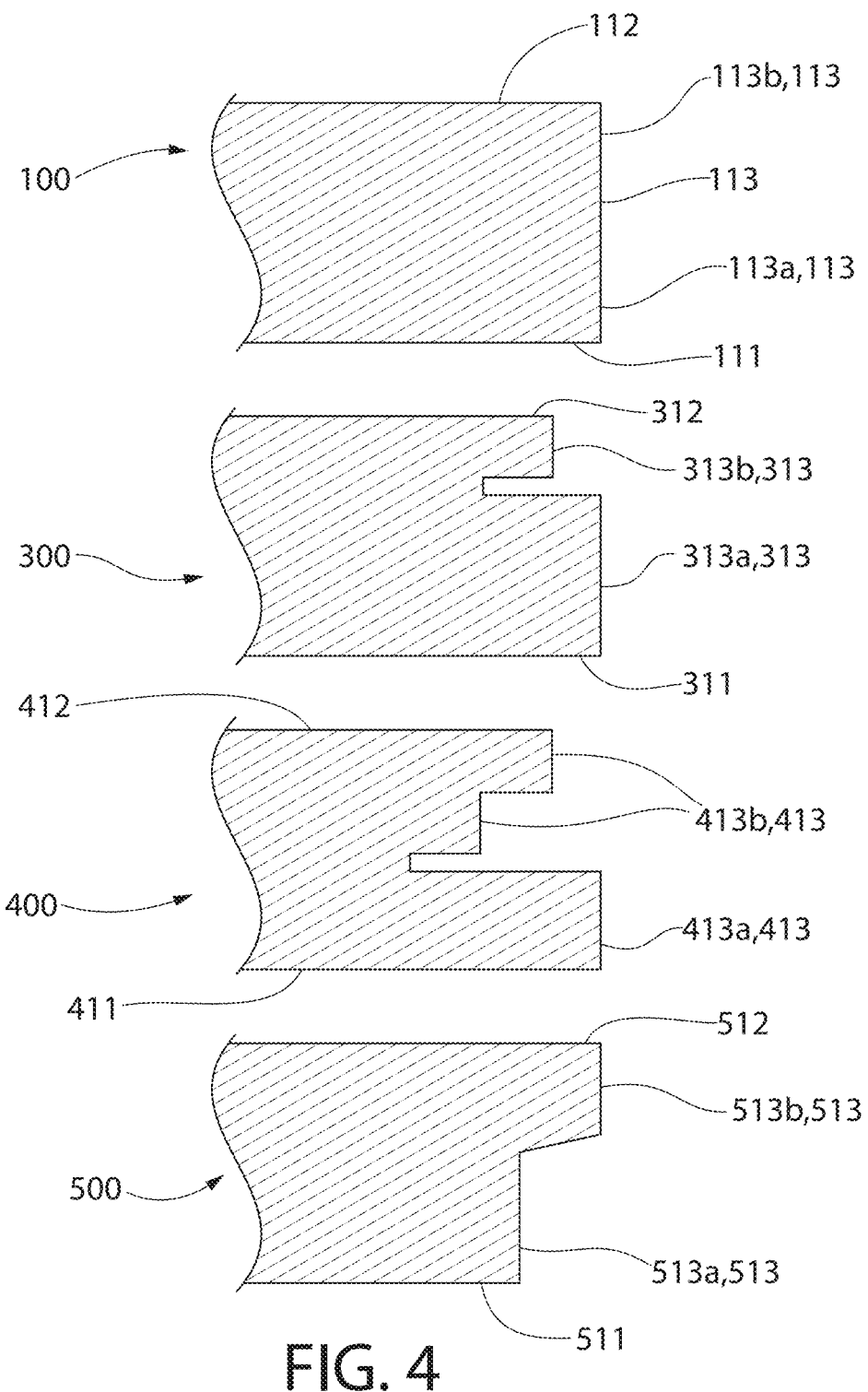
FIG. 4 is a cross-sectional close-up view of the edges of building panels according to certain embodiments of the present invention.

Referring to FIGS. 1 and 4, in certain aspects, the present invention includes a coated panel 100 (referred to herein as "building panel") comprising a first major surface 111 opposite a second major surface 112 and a side surface 113 that extends between the first major surface 111 and the second major surface 112, thereby defining a perimeter of the ceiling panel 100. In certain embodiments, the side surface 113 may comprise an upper portion 113a and a lower portion 113b, wherein the upper portion 113a is adjacent to the first major surface 111 and the lower portion 113b is adjacent to the second major surface 112.

The building panel 100 may have a panel thickness to as measured from the first major surface 111 to the second major surface 112. The panel thickness to may range from about 12 mm to about 40 mm—including all values and sub-ranges there-between. The building panel 100 may have a length LP ranging from about 30 cm to about 310 cm—including all values and sub-ranges there-the building panel 100 may have a width WP ranging from about 10 cm to about 125 cm—including all values and sub-ranges there-between. The density of the building panel may vary. In certain embodiments, the density of the building panel is from about 0.3 $g/cm^3$ to about 1.5 $g/cm^3$. In certain embodiments, the building panel density is from about 0.4 $g/cm^3$ to about 0.9 $g/cm^3$. In further embodiments, the building panel density is from about 0.5 $g/cm^3$ $g/cm^3$ to about 0.7 $g/cm^3$.

The building panel 100 comprises a body 120 and a surface coating 200 applied thereto—as discussed further herein. The body 120 comprises an upper surface 121 opposite a lower surface 122 and a body side surface 123 that extends between the upper surface 121 and the lower surface 122, thereby defining a perimeter of the body 120. The body 120 may have a body thickness $t_1$ that extends from the upper surface 121 to the lower surface 122. The body thickness $t_1$ may range from about 12 mm to about 40 mm—including all values and sub-ranges there-between. The body 120 may be porous, thereby allowing airflow through the body 120 between the upper surface 121 and the lower surface 122. The body 120 may be comprised of a binder and fibers. In some embodiments, the body 120 may further comprise a filler and/or additive.

Figure 2:
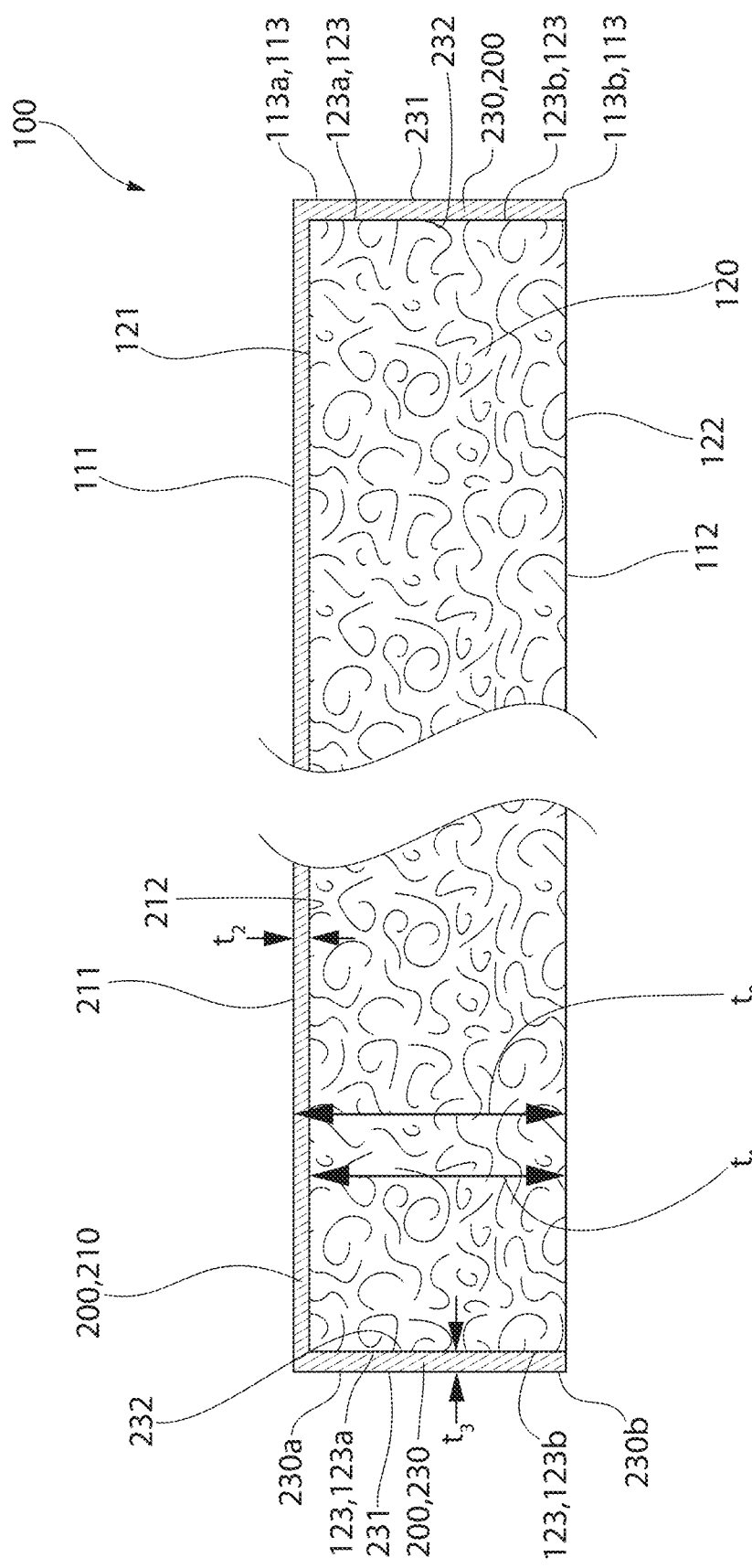
FIG. 2 is a cross-sectional view of the coated building panel according to an embodiment of the present invention, the cross-sectional view being along the II line set forth in FIG. 1.

FIG. 2 shows an embodiment where a coating 200 is present on the upper surface 121 and body side surface 123 of the body 120. In other embodiments, the coating 200 may be only on the upper surface 121, the lower surface 122, the body side surface 123, or a combination thereof. The coating 200 comprises a first side 211 opposite a second side 212. The coating 200 may have a thickness t2 as measured from the first side 211 to the second side 212. One of skill in the art would recognize that a scrim may be applied over the coating 200 without deviating from the invention. Where a coating is present, the total thickness to of the building panel 100 includes the thickness of the coating 200.

In certain embodiments, the building panel may be embossed. Embossment allows for enhanced visual effects of the building panel. For example, various designs and visual depths may be introduced with embossment. In certain embodiments, the building panel may be embossed with various patterns including, but not limited to, woodgrain, smooth or rough textures. Standard methods may be used for the embossment.

Figure 3:
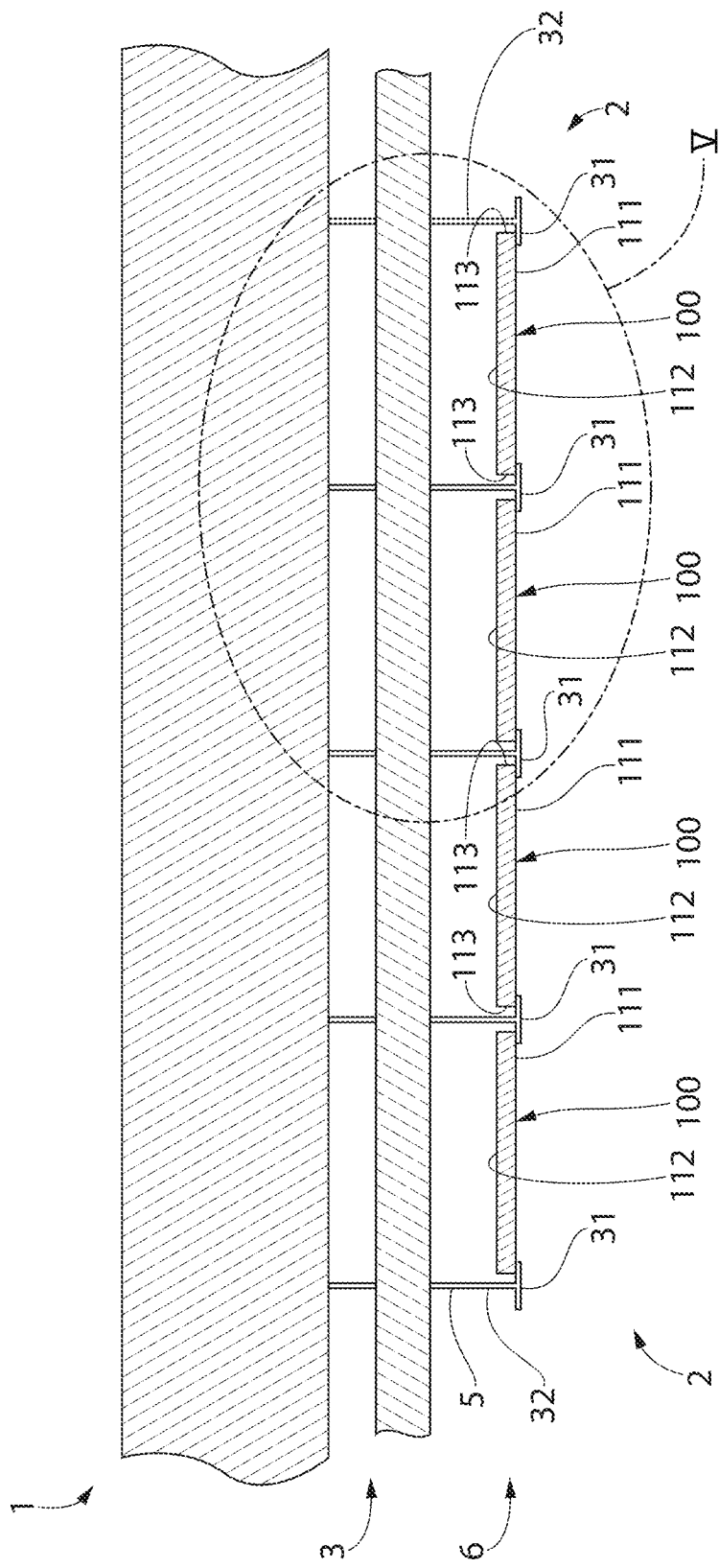
FIG. 3 is an embodiment of a ceiling system comprising the coated building panel of the present invention.

The present invention may further include a ceiling system. FIG. 3 shows an embodiment of a ceiling system 1 comprising one or more of the building panels 100 installed in an interior space, whereby the interior space comprises a plenum space 3 and an active room environment 2. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.). In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 6. The plenum space 3 exists above the ceiling support grid 6 and the active room environment 2 exists below the ceiling support grid 6.

In the installed state, the first major surface 111 of the building panel 100 may face the active room environment 2 and the second major surface 112 of the building panel 100 may face the plenum space 3. The building panel 100 may be installed according to at least two variations. In a first variation, the building panel 100 is positioned entirely above the horizontal flange 31 of the support struts 5. In the first variation, at least a portion of the first major surface may be concealed from the active room environment 2 by the horizontal flange 31 because the horizontal flange 31 contacts the first major surface 111, thereby supporting it in the ceiling system 1. In a first variation, the entire side surface 113—including the upper portion 113*a* and the lower portion 113*b*—may be concealed from the active room environment 2 by the horizontal flange 311. A second variation will be described further herein.

Referring now to FIG. 4, embodiments of building panels 300, 400, 500 are illustrated in accordance with other aspects of the present invention. The building panels 300, 400, and 500 are similar to building panel 100 except as described herein below. The description of building panel 100 above generally applies to building panels 300, 400, and 500 described below except with regard to the differences specifically noted below. A similar numbering scheme will be used for the building panels 300, 400, and 500 as with building panel 100 except that the 300-, 400-, and 500-series of numbers will be used.

Referring now to FIG. 5, the building panel 500 may be installed according to a second variation, as described herein. The building panel 500 may be positioned such that the upper portion 513*a* of the side surface 513 is below the horizontal flange 31, thereby extending into the active room environment 2. The lower portion 513*b* of the side surface 513 is above the horizontal flange 31 extending into the plenum space 3. The first major surface 511 and the upper portion 513*a* of the side surface 513 of the building panel 500 is exposed to the active room environment 2. The lower portion 513*b* of the side surface 513 may be concealed from the active room environment 2. The lower portion 513*b* of the side surface 513 may be adjacent to at least a portion of the vertical web 32 as viewed along a horizontal direction. The lower portion 513*b* of the side surface 513 as well as the second major surface 512 may be exposed to the plenum space 3.

In certain embodiments, the upper portion 513*a* and the lower portion 513*b* may comprise the surface coating 200. In certain embodiments, the first major surface 511 may comprise the surface coating 200. Therefore, in certain embodiments, the surface coating 200 may be exposed to the active room environment on the first major surface 511 and the upper portion 513*a* of the side surface 513 of the building panel 500 in the installed state.

One of skill in the art would appreciate that the coating composition may also be used in other ceiling systems. Therefore, the embodiments described above are non-limiting examples.

In other embodiments, the coated building panel of the invention may be used as a surface covering system. In certain embodiments, the surface covering system comprises a system of panels, each panel comprising a first building panel having a rectangular shape, a first major surface opposite a second major surface and side surfaces extending there-between, a second building panel having a rectangular shape, a first major surface opposite a second major surface and side surfaces extending there-between, a third building panel having a rectangular shape, a first major surface opposite a second major surface and side surfaces extending there-between, wherein the first major surface of the first building panel is in contact with the second major surface of the second building panel, the first major surface of the second building panel is in contact with the second major surface of the third building panel, and wherein the side surfaces of the first building panel and the side surfaces of the third building panel are parallel and the side surfaces of the first building panel and the side surfaces of the second building panel are not parallel. Any one or more of the panels and/or panel surfaces may be covered by the inventive coating composition.

The inventive coated building panel may be attached to a substrate, thus creating a surface covering system. Without intending to be limited, the building panel may be included in a removable surface covering system using adhesive components as disclosed in U.S. Patent Application No. 2019/0270275, filed Mar. 2, 2019. For example, in certain embodiments, the invention is a surface covering system as described herein, further comprising an adhesive tape configured to detachably couple the panels to a substrate, the adhesive tape comprising a substrate-side adhesive component comprising at least one adhesive layer; a panel-side adhesive component comprising at least one adhesive layer; and a release component; wherein the panels are detachably coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component. In other embodiments, the surface covering system comprises an adhesive tape configured to detachably couple the panels to a substrate, the adhesive tape comprising a panel-side adhesive component comprising at least one adhesive layer; an optional substrate-side adhesive component comprising at least one adhesive layer; and an optional release component; wherein the panels are detachably coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component.

In other embodiments, the acoustic building panel may be directly attached to a substrate using one or more attaching means. In certain embodiments, attachment may be accomplished by use of one or more of clips, screw, or adhesive. Various adhesives are known in the art. In a certain non-limiting embodiment, the adhesive is made from synthetic rubber and resin. In certain embodiments, the synthetic rubber and resin has a viscosity of about 230,000 cps. In certain embodiments, the synthetic rubber and resin has a flash point of about −17° C. In another non-limiting embodiment, the adhesive is a water based rubber resin. In another non-limiting embodiment, the adhesive is a two component cross-linking diisocyanate waterborne emulsion. In other embodiments, the adhesive is an aqueous polyvinyl acetate emulsion. In certain embodiments, a water based adhesive using emulsion polymer isocyanate may be used. In other embodiments, a polyurethane based adhesive may be used. In some embodiments the adhesive may be a pressure sensitive adhesive, a hot melt adhesive, or a combination thereof. In some embodiments, the adhesive comprises a hot melt adhesive. In some embodiments, the adhesive comprises a pressure sensitive adhesive. In some embodiments, the adhesive comprises polyvinyl acetate. In some embodiments, the adhesive comprises ethylene vinyl-acetate (EVA).

In certain embodiments, the adhesive is applied at 3 to 30 g/ft$^2$. In certain embodiments, the adhesive is applied at 10 to 25 g/ft$^2$. In certain embodiments, the adhesive is applied at 12 to 20 g/ft$^2$. In certain embodiments, the adhesive is a two-component cross-linking diisocyanate waterborne emulsion applied at 10 to 25 g/ft$^2$. In certain embodiments, the adhesive is a two component cross-linking diisocyanate waterborne emulsion applied at 15 to 25 g/ft$^2$. In certain embodiments, the adhesive is an aqueous polyvinyl acetate emulsion applied at 8 to 25 g/ft$^2$. In certain embodiments, the adhesive is an aqueous polyvinyl acetate emulsion applied at 8 to 15 g/ft$^2$.

An important characteristic for building materials is the burning performance. ASTM E84-20 provides methods to determine the relative burning behavior of the material. In particular, ASTM E84-20 provides methods for determining the Flame Spread Index (FSI) which characterizes how far flames generated on the test material spread. The FSI is measured from 0 (indicating no flames) to 200 (which indicates spreading flames). ASTM E84-20 also provides methods for determining the Smoke Developed Index (SDI) which states how much smoke is generated. SDI is measured on a scale of 0 to 450, which correlates to no smoke generated (value of 0) to thick, heavy smoke (value of 450). Obtained FSI and SDI values are then compiled and applied to a three-tiered class system: Class A, Class B, and Class C, with Class A rated materials producing minimal to no flames or smoke, while Class C materials producing the most flames or smoke. In order to qualify as an E84 Class A fire rating, a flame spread index (FSI) of 25 or less and smoke developed index (SDI) at 450 or less must be exhibited. In certain embodiments, the building panel has a flame spread index (FSI) of about 0 to about 10, as determined by ASTM E84-20. In certain embodiments, the building panel has a flame spread index (FSI) of about 10 as determined by ASTM E84-20. In certain embodiments, the building panel has a flame spread index (FSI) of about 0 as determined by ASTM E84-20. In certain embodiments, the building panel has a smoke developed index (SDI) of about 450, or less, as determined by ASTM E84-20. In certain embodiments, the building panel has a smoke developed index (SDI) of about 350, or less, as determined by ASTM E84-20.

In certain embodiments, the present invention is directed towards a method of forming a temperature stable coating composition, the method comprising mixing calcium carbonate, titanium dioxide, opacity pigment composite comprising TiO$_2$ encapsulated within a precipitated calcium carbonate shell, calcined diatomaceous earth, calcium chloride, aluminum hydroxide, vinyl acrylic polymer, and a solvent to form a mixed coating composition. In certain embodiments, the method further includes adding one or more components to the mixed coating composition, such as, but not limited to, hydrophobic polymer emulsion, wetting and dispersing additive comprising an anionic copolymer, ethoxylated acetylenic gemini surfactant, clay, defoamer comprising wax and mineral oil, and a biocide. In certain embodiments, the solvent is water.

In certain embodiments, the present invention is directed towards methods of forming a panel comprising a heat stable coating composition, the method comprising mixing calcium carbonate, titanium dioxide, opacity pigment composite comprising TiO$_2$ encapsulated within a precipitated calcium carbonate shell, calcined diatomaceous earth, calcium carbonate, aluminum hydroxide, vinyl acrylic polymer, and a solvent to form a mixed composition; applying the mixed composition to a surface of a panel; and heating the panel at an elevated temperature to evaporate the solvent to yield a dry coating composition. In preferred embodiments, the heating step evaporates the solvent to provide for a coating composition having about 92% solids, 95% solids, 99% solids, or 100% solids. In certain embodiments, the method includes further adding one or more components to the mixed composition, such as, but not limited to, hydrophobic polymer emulsion, wetting and dispersing additive comprising an anionic copolymer, ethoxylated acetylenic gemini surfactant, clay, defoamer comprising wax and mineral oil, and a biocide. In certain embodiments, the panel is a building panel. In certain embodiments, the building panel is a ceiling or wall panel. In certain embodiments, the solvent is water.

EXAMPLES

The examples and other implementations described herein are exemplary and not intended to be limiting in describing the full scope of compositions and methods of this disclosure. Equivalent changes, modifications and variations of specific implementations, materials, compositions, and methods may be made within the scope of the present disclosure, with substantially similar results. Unless otherwise indicated, all viscosity values are as measured by Brookfield LVT #2 at 10 rpm and 20° C.

Experiment 1: Formation of coating composition and testing of temperature stability. Coating compositions were prepared in approximate amounts as described in Table 1. After mixing, the wet weight had a total % solids of about 68.6% and a density of about 15.1 lb/gal. The mixed compositions were applied onto a substrate and heated to form a dry coating composition. After heating, no measurable amount of solvent remained. The viscosity of the composition was about 500 centipoise (cP).

TABLE 1

Base coating composition.

| Component | Component Attribute | Wet wt. % | % Solids Of Individual Component | Dry wt. % |
|---|---|---|---|---|
| Water | Solvent | q.s. | 0.00% | 0.00% |
| Hydrophobic polymer emulsion, pH 7-9 | Humectant | 1.86% | 65.00% | 1.8% |
| Wax and mineral oil, density of 850 to 900 kg/m$^3$ at 20° C. | Defoamer | 0.03% | 100.00% | 0.04% |
| Anionic copolymer, acid value of about 2 mg KOH/g | Wetting and dispersing additive | 0.71% | 35.00% | 0.37% |
| Ethoxylated acetylenic gemini surfactant, non-ionic, diol | Surfactant | 0.12% | 100.00% | 0.18% |
| $TiO_2$ | | 18.91% | 100.00% | 28.15% |
| $TiO_2$ encapsulated within a precipitated calcium carbonate shell | Opacity Pigment Composite | 12.60% | 99.00% | 18.57% |
| Aluminum Hydroxide | | 4.52% | 99.60% | 6.7% |
| Calcined diatomaceous earth | Matting Agent | 6.00% | 99.70% | 8.91% |
| Vinyl acrylic polymer | Durability Enhancer/Binder | 6.69% | 55.00% | 5.47% |
| $CaCO_3$ | | 20.00% | 99.60% | 29.66% |
| Biocide | Antimicrobial | 0.21% | | 0.14% |
| Total | | 100% | | 100% |

Undried coating compositions of Table 1 were evaluated for temperature stability by exposing the coating compositions to multiple rounds of freeze/thaw cycles. As the temperature dropped to about 30° F. (or about −1.11° C.), the coating began to thicken and agglomeration was observed. After the first freeze and thaw cycle, the composition was a thick mass. After the second freeze and thaw cycle, the composition solidified to a semi-pliable putty.

Experiment 2: Testing of additive effects on temperature stability. To the wet coating compositions of Table 1 was added various additives, according to Table 2. After mixing, the compositions were re-evaluated for low temperature stability by exposing the coating compositions to multiple rounds of freeze/thaw cycles.

TABLE 2

Stability effects due to freeze and thaw cycles.

| Additive | Wet wt. % | Results |
|---|---|---|
| Propylene glycol methyl ether acetate | 2.3 | Viscosity of about 830 cP, after 1 freeze/thaw cycle the composition formed rubberlike material, does not completely dissolve. |
| Dipropylene glycol monomethyl ether | 2.3 | Viscosity of about 750 cP, after 2 freeze/thaw cycles the composition formed rubberlike material, does not completely dissolve. |
| Calcium chloride | 2.5 | Viscosity of about 1090 cP, after 2 freeze/thaw cycles the composition became thicker than the previous cycle but contained no particles and showed good flow. After the fourth cycle, the composition became a thick mass having a dough-like consistency. |
| Calcium formate | 2.5 | Viscosity of about 4120 cP, after 1 freeze/thaw cycle the components cannot be completely dissolved. |
| Potassium formate | 5 | Thickened to a high level. |

As shown within Table 2, use of various additives resulted in the physical attributes of the coating composition to change. Use of either propylene glycol methyl ether acetate, dipropylene glycol monomethyl ether, or calcium formate resulted in the inability to completely dissolve the components. Use of potassium formate resulted in thickened compositions. Surprisingly and unexpectedly, use of calcium chloride yielded compositions having dissolved components and flow up the fourth cycle freeze/thaw cycle.

Experiment 3: Further characterization of calcium chloride as an additive. Coating compositions having various amounts of calcium chloride were prepared according to Table 3 and Table 4 and analyzed for temperature stability. Table 3 highlights the amounts of calcium chloride in the exemplary coating compositions, and Table 4 lists the components of the exemplary coating compositions based on the total weight of the exemplary compositions in a dry state. The final mixed compositions had a wet weight total % solids of about 68.6% for Examples 1 and 2 and about 70.1% for Example 3 and a density of about 15.1 lb/gal for Examples 1, 2, and 3.

TABLE 3

Addition of calcium chloride to coating compositions.

| | Component | Wet wt. % | % Solids Of Individual Component | Dry wt. % | pH |
|---|---|---|---|---|---|
| Ex. 1 | Calcium chloride | 2.5 | 93.0 | 3.25 | 6.56 |
| Ex. 2 | | 5.0 | 93.0 | 6.48 | 6.7 |
| Ex. 3 | | 7.5 | 93.0 | 9.66 | 7.17 |

TABLE 4

Coating compositions based on the dry weight of the compositions.

| Component | Ex. 1 (Dry wt. %) | Ex. 2 (Dry wt. %) | Ex. 3 (Dry wt. %) |
|---|---|---|---|
| Calcium chloride | 3.25 | 6.48 | 9.66 |
| Hydrophobic polymer emulsion, pH 7-9 | 1.69 | 1.68 | 1.67 |
| Wax and mineral oil, density of 850 to 900 kg/m$^3$ at 20° C. | 0.04 | 0.04 | 0.04 |
| Anionic copolymer, acid value of about 2 mg KOH/g | 0.35 | 0.35 | 0.34 |
| Ethoxylated acetylenic gemini surfactant, non-ionic, diol | 0.17 | 0.17 | 0.16 |
| $TiO_2$ | 26.46 | 26.33 | 26.18 |
| $TiO_2$ encapsulated within a precipitated calcium carbonate shell | 17.46 | 17.37 | 17.27 |
| Aluminum Hydroxide | 6.97 | 6.27 | 5.52 |
| Calcined diatomaceous earth | 9.77 | 8.33 | 6.9 |

TABLE 4-continued

Coating compositions based on the dry weight of the compositions.

| Component | Ex. 1 (Dry wt. %) | Ex. 2 (Dry wt. %) | Ex. 3 (Dry wt. %) |
|---|---|---|---|
| Vinyl acrylic polymer | 5.15 | 5.12 | 5.09 |
| CaCO$_3$ | 28.57 | 27.74 | 27.03 |
| Biocide | 0.13 | 0.13 | 0.13 |
| Total | 100 | 100 | 100 |

While the composition having 2.5 wet wt. % of CaCl$_2$ gained a thick, dough-like consistency, after four freeze and thaw cycles, no particulates were observed. More so, at 5.0 wet wt. % of CaCl$_2$, after up to four freeze/thaw cycles, the composition had no particulates and had good flow. After a fifth freeze/thaw cycle, the composition started to thicken but maintained its liquid properties. At 7.5 wet wt. % of CaCl$_2$, the composition had no particulates and had excellent flow after five freeze/thaw cycles.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A coating composition comprising:
   calcium carbonate;
   titanium dioxide;
   opacity pigment composite comprising TiO$_2$ encapsulated within a precipitated calcium carbonate shell;
   calcined diatomaceous earth;
   calcium chloride;
   aluminum hydroxide; and
   vinyl acrylic polymer,
   wherein the weight ratio of calcium carbonate and calcined diatomaceous earth to vinyl acrylic polymer is from about 3:1 to about 15:1, from about 4:1 to about 12:1, from about 5:1 to about 10:1, or from about 5:1 to about 8.5:1, based on the dry weight of the composition.

2. The coating composition of claim 1, wherein the calcium carbonate is present in an amount from about 20 wt. % to about 40 wt. %, from about 25 wt. % to about 35 wt. %, or from about 27.0 wt. % to about 32.5 wt. %, based on the dry weight of the composition.

3. The coating composition of claim 1, wherein the titanium dioxide not part of the opacity pigment composite is present in an amount from about 10 wt. % to about 40 wt. %, from about 15 wt. % to about 35 wt. %, or from about 20 wt. % to about 30wt. %, based on the dry weight of the composition.

4. The coating composition of claim 1, wherein the opacity pigment composite is present in an amount from about 8 wt. % to about 30 wt. %, from about 10 wt. % to about 25 wt. %, or from about 15 wt. % to about 20 wt. %, based on the dry weight of the composition.

5. The coating composition claim 1, wherein the calcined diatomaceous earth is present in an amount from about 3 wt. % to about 20 wt. %, from about 5 wt. % to about 17.5 wt. %, or from about 7.5 wt. % to about 15 wt. %, based on the dry weight of the composition.

6. The coating composition of claim 1, wherein the calcium chloride is present in an amount from about 2.5 wt. % to about 20 wt. %, from about 5wt. % to about 15 wt. %, or from about 5 wt. % to about 10 wt. %, based on the dry weight of the composition.

7. The coating composition of claim 1, wherein the aluminum hydroxide is present in an amount from about 3 wt. % to about 20 wt. %, from about 5wt. % to about 15 wt. %, or from about 5 wt. % to about 10 wt. %, based on the dry weight of the composition.

8. The coating composition of claim 1, wherein the vinyl acrylic polymer is present in an amount from about 2 wt. % to about 20 wt. %, from about 2 wt. % to about 15 wt. %, or from about 3 wt. % to about 10 wt. %, based on the dry weight of the composition.

9. The coating composition of claim 1, wherein the composition further comprises a hydrophobic polymer emulsion, and wherein the hydrophobic polymer emulsion is present in an amount from about 0.1 wt. % to about 10 wt. %. from about 0.5 wt. % to about 5.0 wt. %, or from about 0.75 wt. % to about 3 wt. %, based on the dry weight of the composition.

10. The coating composition of claim 1, wherein the composition further comprises a wetting and dispersing additive comprising an anionic copolymer, wherein the wetting and dispersing additive is present in an amount from about 0.1wt. % to about 5 wt. %. from about 0.1 wt. % to about 2 wt. %, or from about 0.1 wt. % to about 0.5 wt. %, based on the dry weight of the composition, and wherein the wetting and dispersing additive has an acid value of about 2 mg KOH/g.

11. The coating composition of claim 1, wherein the composition further comprises an ethoxylated acetylenic gemini surfactant, optionally wherein the surfactant is nonionic, and wherein the ethoxylated acetylenic gemini surfactant is present in an amount from about 0.01 wt. % to about 2 wt. %, from about 0.01 wt. % to about 1wt. %, or from about 0.01 wt. % to about 0.5 wt. %, based on the dry weight of the composition.

12. The coating composition of claim 1, wherein the composition contains no clay.

13. The coating composition of claim 1, wherein the composition further comprises clay, wherein the clay is present in an amount from about 0.01 wt. % to about 5 wt. %, from about 0.03 wt. % to about 2 wt. %, or from about 0.03 wt. % to about 0.5 wt. %, based on the dry weight of the composition, and wherein the clay comprises hectorite clay.

14. The coating composition of claim 1, wherein the weight ratio of calcium carbonate to vinyl acrylic polymer is from about 2:1 to about 15:1, from about 2:1 to about 12:1, from about 2:1 to about 10:1, or from about 3:1 to about 8:1, based on the dry weight of the composition.

15. The coating composition of claim 1, wherein the weight ratio of calcined diatomaceous earth to vinyl acrylic polymer is from about 0.5:1 to about 10:1, from about 0.75:1 to about 10:1, from about 1:1 to about 7:1, or from about 0.5:1 to about 4:1, based on the dry weight of the composition.

16. The coating composition of claim 1,
   wherein the weight ratio of titanium dioxide not part of the opacity pigment composite, opacity pigment, and calcium carbonate to calcium chloride is from about 30:1 to about 5:1, from about 28:1 to about 5.5:1, from about 20:1 to about 6:1, or from about 10:1 to about 6:1, based on the dry weight of the composition.

17. A panel comprising a first major surface opposite a second major surface and a side surface extending therebetween, the panel coated on at least one surface with a coating composition comprising:
   calcium carbonate;
   titanium dioxide;
   opacity pigment composite comprising TiO2 encapsulated within a precipitated calcium carbonate shell;
   calcined diatomaceous earth;
   calcium chloride;
   aluminum hydroxide; and
   vinyl acrylic polymer,
   wherein the weight ratio of calcium carbonate and calcined diatomaceous earth to vinyl acrylic polymer is from about 3:1 to about 15:1, from about 4:1 to about 12:1, from about 5:1 to about 10:1, or from about 5:1 to about 8.5:1, based on the dry weight of the composition.

* * * * *